3,336,278
PROCESS OF POLYMERIZING MONO-OLEFINS AND CATALYST THEREFOR
Theodor Ploetz, Hosel, Kreis Mettmann, Hermann Richtzenhain, Cologne-Suelz, Rudolf Modic, Lulsdorf uber Troisdorf, and Helmut aus der Fuenten, Mondorf, Siegkreis, Germany, assignors, by mesne assignments, to Dynamit Nobel Aktiengesellschaft, Troisdorf, Germany, a company of Germany
No Drawing. Filed Mar. 1, 1960, Ser. No. 12,008
Claims priority, application Germany, Mar. 4, 1959, F 27,858; July 11, 1959, F 28,907
3 Claims. (Cl. 260—88.2)

The present invention relates to a process of polymerizing mono-olefins to high-molecular resinous polymers and more particularly to a process of polymerizing such mono-olefins by means of a highly effective three-component catalyst, and to the three-component catalyst used in said process.

Catalysts have been described heretofore which were prepared from compounds of metals of the sub-group A of Groups IV to VI of the periodic system including thorium and uranium, on the one hand, and from organo-metallic compounds, especially of aluminum, magnesium, and zinc, on the other hand. This large group of catalysts is said to be suitable for the preparation of high molecular resinous polymers from olefins. Subsequently, this statement was partly revoked in the German Utility Model Patent No. 1,039,055, wherein it was stated that a certain group of the above mentioned catalyst mixture does not produce high molecular resinous polymers but only dimeric compounds or polymers of low molecular weight when using mono-olefins as starting materials. This specific group of catalysts which are unsuitable for the production of high molecular polymers consists of mixtures of trialkyl aluminum compounds and esters of titanic or zirconic acids. As catalysts of this type can be made in a simple and economic manner, it is of great importance to the art to find means and ways to render them suitable for the polymerization of mono-olefins to high molecular compounds.

It is one object of the present invention to provide such means of utilizing said catalyst mixtures for the polymerization of mono-olefins to high-molecular polymerization products and to provide new and valuable catalyst mixtures which are suitable for this purpose.

Another object of the present invention is to provide a simple and effective process of polymerizing olefins to high-molecular polymers at moderate temperature and pressure whereby a three-component catalyst system is used.

Still another object of the present invention is to provide a process of producing co-polymers starting from a single monomer.

These and other objects of the present invention and advantageous features thereof will become apparent as the description proceeds.

Surprisingly and unexpectedly it has been found that mono-olefins can readily be polymerized to form valuable high molecular resinous products by using as catalysts three-component systems comprising an aluminum alkyl compound, an ester of titanic acid or zirconic acid, and halogen, pseudo-halogen, or a compound containing halogen or pseudo-halogen. (As defined by L. Birckenbach u. K. Kellermann in Ber. dtsch. chem. Ges. 1925, 786.)

The aluminum alkyl compound may either be trialkyl aluminum or an aluminum alkyl hydride. The alkyl group preferably contains 2 to 8 carbon atoms and may be a straight-chain or branched alkyl group.

The esters of titanic or zirconic acid may include alkyl esters, such as the propyl, isopropyl, butyl, isobutyl, hexyl, isohexyl, octyl, isooctyl ester, cycloalkyl esters such as the cyclopentyl or cyclohexyl ester, or aralkyl esters such as the benzyl ester.

The halogens which can be used comprise chlorine, bromine, and iodine while the halogen compounds refer both to inorganic and organic halogen-containing compounds. The term "pseudo-halogen" as used herein and in the claims annexed hereto refers, for instance, to the cyano group and the thiocyano group. Organic compounds containing such groups are preferred components of the catalyst mixture.

In general the process according to the present invention is carried out by dissolving or suspending the three-component catalyst in an organic solvent and contacting the olefin to be polymerized with this solution or suspension. Polymerization is preferably carried out under pressure. While there is no upper limit for the pressure, it is preferred for technical and economical reasons to work at a pressure below 40 atmospheres. The temperature at which the polymerization may be carried out may range from about −20° C. to about +150° C., but it is preferred to work within the temperature range between about +20° C. and about +90° C. When using halogen or pseudo-halogen compounds which are insoluble in the organic solvent it is advisable to convert these compounds into a finely divided state in order to render them more reactive.

It is often possible to recover the catalyst and to again use the same in a subsequent polymerization process.

The process according to the present invention may be modified in such a manner that the third catalyst component comprising halogen or pseudo-halogen is omitted in the first step of the polymerization. A catalyst which contains only the aluminum alkyl compound and the ester of titanic or zirconic acids causes merely dimerization of the mono-olefin. On the addition of the third component polymerization of the dimerization product to a high molecular resinous polymer is effected. By the delayed addition of the third catalyst component it is, for instance, possible to obtain polybutylene from ethylene.

The process according to the present invention is likewise suitable for producing co-polymers from the same monomer. Co-polymers of the monomer with the dimerization product of said monomer are obtained if the third catalyst component is added after dimerization of the monomer and addition of the monomer is continued. If, for instance, ethylene is the starting material, an ethylene-butylene co-polymer can be obtained when proceeding in this manner.

It is likewise within the scope of the present invention first to carry out the dimerization of one monomer by means of the first two catalyst components, and then, after adding the third catalyst component, carrying out copolymerization of the resulting dimer with a different monomer.

Finally it is possible to use a mixture of monomers both in the one-step process and in the two-step process after formation of the dimer.

Using the various embodiments of the present invention a broad range of polymers and co-polymers can be obtained, which due to their different properties have a wide field of application. The polymers and co-polymers have a high softening point. This property makes them very suitable for the production of containers, sheets, and the like materials and articles which do not change their shape, for instance, when exposed to boiling water, and which may even be sterilized with super-heated steam. The viscosity of the polymers and co-polymers according to the present invention can be controlled within a broad range by proper selection of the halogen or pseudo-halogen component or by the addition of hydrogen to the reaction mixture. Thus products having different properties with respect to hardness, strength, flexibility, workability and the like are obtained.

The following examples serve to illustrate the present invention without, however, limiting the same thereto.

*Example 1*

50 g. of triisobutyl aluminum and 13 g. of titanic acid tetrabutyl ester are dissolved in a 5 l. autoclave in 2.5 l. of benzine and 2 g. of magnesium chloride are suspended in said solution. Ethylene is introduced into the resulting suspension at about 50° C. and a pressure which may increase to a pressure of 30 atm. gauge. The resulting polymerization mixture is worked up in a manner known to the art by treatment with methanolic hydrochloric acid. On filtering, washing, and drying, 25 g. of polyethylene of the softening point 215° C. and a reduced viscosity of 5.8 (determined in a 0.01% solution in dekalin at 135° C.) are obtained.

The following examples are carried out in the same manner and with the same amount of triisobutyl aluminum and titanic acid tetrabutyl ester while the amounts and the type of the halogen or pseudo-halogen compound are varied.

| Ex. No. | Third catalyst compound added | | Yield, g. | Softening point, ° C. | Reduced* viscosity |
|---|---|---|---|---|---|
| | Amount in g. | Compound | | | |
| 2 | 2.0 | Lithium chloride | 7.5 | 145–150 | 1.2 |
| 3 | 2.7 | Cupric chloride | 28.0 | 195 | 6.9 |
| 4 | 2.5 | Zinc chloride | 5.0 | 200 | 2.5 |
| 5 | 2.0 | Boron trifluoride | 107.0 | 200 | 13.3 |
| 6 | 3.5 | Silicon tetrachloride | 25.0 | 215 | 10.2 |
| 7 | 4.0 | Titanium tetrachloride | 61.0 | 205 | 8.7 |
| 8 | 4.5 | Antimony trichloride | 5.0 | 185 | 3.8 |
| 9 | 3.5 | Bromine | 38.0 | 200 | 8.6 |
| 10 | 2.5 | Manganous chloride | 10.5 | 220 | 4.1 |
| 11 | 2.6 | Cobaltous chloride | 59.0 | 190–195 | 8.05 |
| 12 | 3.0 | Chloroform | 68.0 | 205–210 | 8.3 |
| 13 | 3.1 | Bromo benzene | 17.0 | 205–210 | 6.3 |
| 14 | 3.0 | Allyl chloride | 30.0 | 210 | 5.6 |
| 15 | 3.5 | Vinyl chloride | 226.0 | 210 | 5.7 |
| 16 | 4.0 | Vinylidene chloride | 166.0 | 215 | 9.2 |
| 17 | 4.0 | Benzonitrile | 189.0 | 178–180 | 3.5 |
| 18 | 1.6 | Acetonitrile | 178.0 | 168–172 | 3.4 |
| 19 | 2.1 | Acrylonitrile | 205.0 | 195–200 | 6.3 |

*0.01% solution in dekalin at 135° C.

Cyclohexane is used as solvent in Example 9 in place of benzine. Chlorine and iodine produce the same results as bromine.

A comparison of the results achieved when proceeding according to Examples 1 to 19 and using the three-component catalyst systems mentioned clearly shows that the use of organic halogen compounds or, respectively, pseudo-halogen compounds is especially advantageous. This is most probably due to the fact that such compounds are very intimately and uniformly distributed throughout the reaction mixture or are dissolved therein. When using inorganic halogen compounds or pseudo-halogen compounds it was also found that their catalytic effect sets in more rapidly and is more complete when using said compounds in extremely fine distribution. Therefore, no specific reaction time is given in the examples because the reaction time varies depending upon the degree of distribution of the compounds. As a result thereof it is possible to adjust the reaction time to any desired value. Likewise, variation of temperature and pressure also affects considerably the yield.

*Example 20*

50 g. of triisobutyl aluminum, 13 g. of titanic acid tetrabutyl ester, and 4 cc. of vinylidene chloride in 2.5 l. of benzine are placed into a 5 l. autoclave. Propylene is introduced into said mixture and the autoclave is heated to 90° C. After working up the reaction mixture as described in Example 1, 2.5 g. of a rubber-like polypropylene of the softening point 185–190° C. and the reduced viscosity 3.3 are obtained.

*Example 21*

Ethylene is dimerized to butene by introducing the same into 50 g. of triisobutyl aluminum and 13 g. of titanic acid tetrabutyl ester in 2.5 l. benzine at room temperature. Thereafter, 3 g. of vinylidene chloride are added and the autoclave is heated to 50° C. and is kept at said temperature for 7 hours. On working up the reaction mixture as described in Example 1, the resulting polybutylene has the softening point 180–185° C. and a reduced viscosity of 3.02.

*Example 22*

50 g. of triisobutyl aluminum and 13 g. of titanic acid tetrabutyl ester are dissolved in 2.5 l. of benzine. The solution is placed into a 5 l. autoclave and ethylene is introduced thereinto at 30° C. at a pressure rising to 20 atm. gauge. Dimerization to butylene takes place and the pressure decreases rapidly. 12 cc. of vinylidene chloride are then added to the polymerization mixture and introduction of ethylene is continued to a pressure of 30 atm. gauge. The reaction mixture is worked up as described in Example 1 whereby 205 g. of an ethylene-butylene copolymerization product are obtained. Softening point: 190–195° C.; reduced viscosity: 6.8.

*Example 23*

57.5 g. of diisobutyl aluminum hydride, 30.8 g. of titanic acid tetrabutyl ester, and 4.8 g. of acrylonitrile are dissolved in 10 l. of benzine. Ethylene is introduced into the catalyst solution at 50–60° C. at a maximum pressure of 5 atm. gauge for 3 hours. The reaction mixture is worked up as described in Example 1. 1116 g. of a polymerization product of the softening point 200° C. (sintering at 135° C.) and a reduced viscosity 1.7 (determined in 0.01% solution in dekalin at 135° C.) are obtained.

*Example 24*

28.7 g. of diisobutyl aluminum hydride, 40 g. of triisobutyl aluminum, 30.8 g. of titanic acid tetrabutyl ester, and 4.8 g. of acrylonitrile are dissolved in 10 l. of benzine. The mixture is treated with ethylene at 50–60° C. for 5 hours whereby the maximum pressure is 8 atm. gauge. The resulting polymerization product has a softening point of 225° C. and starts to sinter at 220° C. The reduced viscosity, determined in 0.01% solution in dekalin at 135° C., is 9.7. The yield amounts to 943 g.

*Example 25*

14.4 g. of diisobutyl aluminum hydride, 20 g. of triisobutyl aluminum, 13 cc. of titanic acid tetrabutyl ester, and 1.56 g. of acetonitrile are dissolved in 2.5 l. of benzine. The mixture is treated with ethylene under pressure (maximum pressure: 10 atm. gauge) at 50–60° C. for 6 hours. The resulting polymerization product has a softening point of 165–170° C. and starts to sinter at 130° C. Its reduced viscosity, determined in 0.01% solution in dekalin at 135° C., is 2.8. The yield amounts to 173 g.

In place of ethylene and propylene as used in the preceding examples, there may be employed other mono-olefins such as butene-1, butene-2, or mixtures of such mono-olefins, especially of ethylene and propylene, or others while otherwise the procedure is the same as in the preceding examples.

The proportion of aluminum in the organo-metallic aluminum compound to titanium, zirconium, or other metals of the sub-group A of Groups IV to VI of the Periodic System in the esters of said metal may, of course, vary considerably and other proportions than those employed in the examples may be used, for instance, proportions within the range between 1:0.1 and 1:20. The preferred proportions are proportions within the range between 1:0.1 and 1:2.

In place of the esters of titanic acid as used in the examples, there may also be used organic ester of acids of other metals of the sub-groups A of the IVth to VIth Group of the Periodic System, for instance, as it is given in "The Merck Index of Chemicals and Drugs" published by Merck & Co., Inc., of Rahway, N.J., 1952, such as organic esters of acids of chromium, tantalum, tungsten, thorium, uranium, niobium, zirconium, vanadium, and molybdenum, i.e. of such metals which are capable of forming acids. Although the preferred esters are the lower alkyl esters, other esters may also be used such as the esters with cyclohexanol or with higher alcohols such as with 2-ethyl hexanol or with aromatic alcohols such as benzyl alcohol and others.

It is evident that the pressure at which polymerization is effected, is limited merely by apparatus considerations. For practical reasons it should not exceed a pressure of about 40 atm. gauge.

As is well known in this art polymerization is preferably effected in the presence of a suitable solvent. Especially valuable solvents are aliphatic, cycloaliphatic, and aromatic hydrocarbons in which the polyolefins are not soluble while the metal compounds used as catalysts are soluble therein.

Working up of the polymerization mixture and isolation and purification of the polymerization product therefrom is carried out in the usual manner as described in the art. The preferred method of decomposing the catalyst mixture consists in the addition of a lower alcohol and/or a dilute mineral acid, such as nitric acid, sulfuric acid, and preferably hydrochloric acid.

The term "reduced viscosity" ($\eta$ red.) as given in the examples is defined as the quotient of the specific viscosity ($\eta$ spec.) by the concentration, i.e.

$$\eta \text{ red.} = \frac{\eta \text{ spec.}}{\text{concentration}}$$

Of course, many changes and variations in the olefins used in the polymerization reaction according to the present invention, in the polymerization conditions, temperature, pressure, duration, in the solvents and diluents employed, in the catalyst mixtures, in the methods of working up the polymerization mixtures and of isolating and purifying the polymerization products and the like may be made by those skilled in the art in accordance with the principles set forth herein and in the claims annexed hereto.

The following example specifically describes the use of titanic acid 2-ethylhexylester and of diisobutyl aluminum hydride as components of the three-component catalyst mixture.

Example 26

72 ml. of diisobutyl aluminium hydride, 51 ml. of titanic acid 2-ethylhexylester and 6.16 ml. of acrylonitrile are dissolved in 10 l. of benzine and treated with ethylene for one hour and a half at a pressure of 2–3 atm. gauge. After the addition of 3 l. of isopropanol, filtration and washing with methanol 1400 g. of a dry polymerization product are obtained (red. viscosity 2.6 melting index 0.8 (190° C./2.16 kg.)).

We claim:

1. In a process of producing a co-polymerization product from ethylene and butylene, the steps which comprise introducing ethylene into a catalyst mixture composed of triisobutyl aluminum and titanic acid tetrabutyl ester in benzine at about 30° C. under pressure, keeping the mixture at said temperature until dimerization of ethylene to butene is completed, adding vinylidene chloride to the dimerization mixture, said vinylidene chloride being added in a considerably smaller amount than the other catalyst, introducing further amounts of ethylene into the dimerization mixture, keeping the polymerization mixture at the polymerization temperature of 30° C. until polymerization is completed, and isolating the resulting ethylene-butylene co-polymerization product from the reaction mixture.

2. In a process of polymerizing mono-olefins to high-molecular resinous polymerization products, the steps which comprise introducing the mono-olefin into a solution, in a substantially inert organic solvent, of a catalyst mixture consisting of an ester selected from the group consisting of an organic ester of titanic acid, zirconic acid, and vanadic acid and an organo-aluminum compound selected from the group consisting of trialkyl aluminum and aluminum alkyl hydride, keeping the polymerization mixture at polymerization temperature until dimerization of the mono-olefin is effected, adding to the resulting dimerization mixture a catalytically effective organic compound selected from the group consisting of an unsaturated organic halogen compound with at least one halogen at the double bond and an organic nitrile, said catalytically effective organic compound being added in a considerably smaller amount than the other catalysts, continuing polymerization until completed, and isolating the resulting high-molecular resinous copolymerization product from the polymerization mixture.

3. In a process of polymerizing mono-olefins to high-molecular resinous polymerization products, the steps which comprise introducing the mono-olefin into a solution, in a substantially inert organic solvent, of a catalyst mixture consisting of an ester selected from the group consisting of an organic ester of titanic acid, zirconic acid, and vanadic acid and an organo-aluminum compound selected from the group consisting of trialkyl aluminum and aluminum alkyl hydride, keeping the polymerization mixture at polymerization temperature until dimerization of the mono-olefin is effected, adding to the resulting dimerization mixture a catalytically effective organic compound selected from the group consisting of an unsaturated organic halogen compound with at least one halogen at the double bond and an organic nitrile, said catalytically effective organic compound being added in a considerably smaller amount than the other catalysts, introducing further amounts of mono-olefin into the dimerization mixture, keeping the mixture at polymerization temperature until polymerization is completed, and isolating the resulting high-molecular resinous copolymerization product from the polymerization mixture.

References Cited

UNITED STATES PATENTS

| | | | |
|---|---|---|---|
| 2,922,782 | 1/1960 | Hay | 260—94.9 |
| 2,943,125 | 6/1960 | Ziegler et al. | 260—94.9 |
| 2,948,712 | 8/1960 | Coover | 260—93.7 |
| 2,959,576 | 11/1960 | Payne | 260—94.9 |
| 3,029,231 | 4/1962 | Amerongen | 260—93.7 |
| 3,101,327 | 8/1963 | Lyons | 260—94.93 |

FOREIGN PATENTS

| | | |
|---|---|---|
| 552,578 | 5/1957 | Belgium. |
| 214,144 | 3/1961 | Austria. |

OTHER REFERENCES

Gaylord: Linear and Stereoregular Addition Polymers, page 107, 1959.

JOSEPH L. SCHOFER, Primary Examiner.

MORRIS LIEBMAN, JOSEPH R. LIEBERMAN, JAMES A. SEIDLECK, Examiners.

D. E. OLSON, F. L. DENSON, Assistant Examiners.